United States Patent [19]

Gwyther

[11] Patent Number: 5,106,336
[45] Date of Patent: Apr. 21, 1992

[54] METHOD AND DEVICE FOR SUPPORTING A SUSPENDED ANIMAL CARCASS DURING HIDE REMOVAL

[75] Inventor: Peter Gwyther, Omaha, Nebr.

[73] Assignee: Jarvis Products Corporation, Middletown, Conn.

[21] Appl. No.: 637,483

[22] Filed: Jan. 4, 1991

[51] Int. Cl.[5] .............................................. A22B 5/16
[52] U.S. Cl. .................................... 452/187; 452/178; 452/129
[58] Field of Search ............... 452/187, 185, 189, 190, 452/178, 179, 129, 128

[56] References Cited

U.S. PATENT DOCUMENTS

| 3,206,798 | 7/1965 | Aubert | 452/178 |
| 3,478,386 | 11/1969 | Robison et al. | 452/128 |
| 4,011,820 | 3/1977 | Bordenaue et al. | 452/178 |
| 4,021,883 | 5/1977 | Schmidt, Jr. | 452/129 |
| 4,035,868 | 7/1977 | Gardner et al. | 452/128 |
| 4,164,056 | 8/1979 | Hilgner et al. | 452/128 |
| 4,653,149 | 3/1987 | Swilley | 452/129 |
| 4,873,749 | 10/1990 | Couture | 452/128 |
| 4,934,027 | 6/1990 | Kjorum et al. | 452/129 |

Primary Examiner—Willis Little

[57] ABSTRACT

Method and device for supporting a suspended animal carcass during hide removal comprising a leg holder adapted to engage and hold the legs of the carcass and a means for lifting the leg holder relative to the suspension means to raise the carcass and reduce strain at the suspension means.

22 Claims, 2 Drawing Sheets

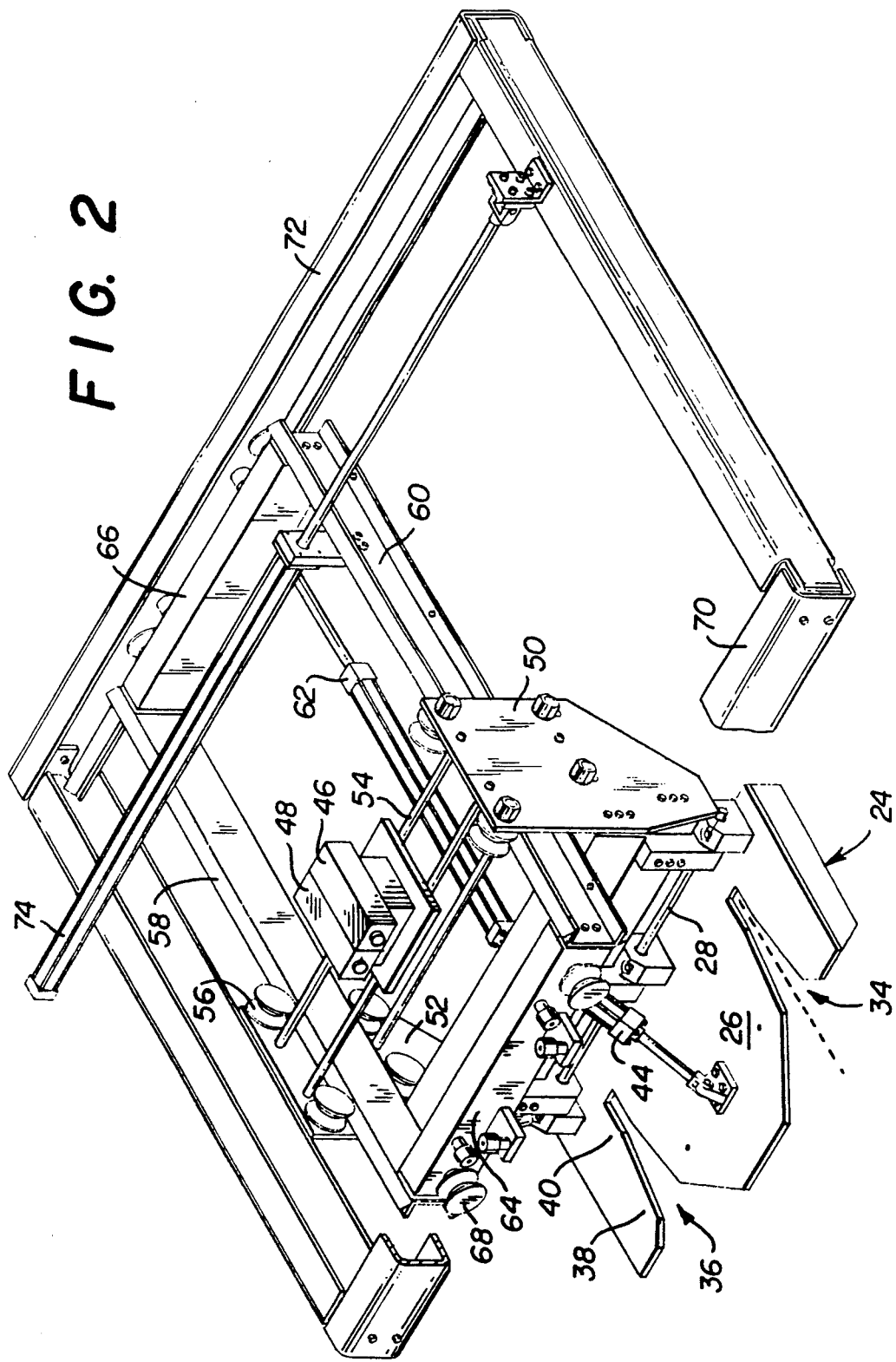

5,106,336

METHOD AND DEVICE FOR SUPPORTING A SUSPENDED ANIMAL CARCASS DURING HIDE REMOVAL

BACKGROUND OF THE INVENTION

I. Field of the Invention

This invention relates to a method and device for temporarily providing additional support to a suspended animal carcass, such as a carcass suspended for movement along an overhead trolley rail, to prevent the carcass from being pulled from its suspension point while the hide is being pulled from the carcass.

II. Description of Related Art

In the meat packing industry animal carcasses are generally suspended from their hind legs on two hooks carried on trolleys which are continuously driven along an overhead trolley rail to move the carcass through the meat processing facility. As the carcass arrives at the hide removal station, the hide is attached to a linear or rotary puller which pulls the hide from the carcass.

At one time the hide removal operation was accomplished by securely clamping the forelegs of the carcass and pulling the hide upwards towards the hind legs and away from the clamped forelegs. Leg holding machines and hide pullers according to this method are seen in U.S. Pat. Nos. 4,653,149 and 4,164,056.

One problem with this method has been the difficulty in automatically locating and clamping the forelegs of the carcass. Unlike the hind legs, which are in a known position close to the overhead trolley rail, the forelegs are dangling, making it difficult to automatically locate and clamp them. Moreover, in the beef packing industry it has now been found to be preferable to pull the hide down from the hind legs towards the head.

Until recently, this downwards pull method was accomplished with the carcass supported only by the trolley hooks on the overhead rail. An example of this method is seen in U.S. Pat. No. 4,021,883.

The trolley hooks provide sufficient support to hold the carcass against the force of gravity. Unfortunately, however, the very large forces generated during the hide pulling operation are occasionally sufficient to pull the carcass from the trolley hooks. This results not only in a loss of time as the carcass is replaced on the trolley, but also a loss of meat as the carcass is trimmed manually.

Accordingly, supplemental supporting devices have been developed to provide additional support to the hind legs during the hide pulling operation. Such a device is seen in U.S. Pat. No. 4,873,749. In this design, two clamps are extended which encircle the hind legs of the carcass just below the suspension point on each leg at the trolley hook.

However, it has been found that even with this type of supplemental support, carcasses have continued to be pulled from the suspension points on the trolley hooks. A further problem has been that the leg gripping mechanism is relatively complex, and includes multiple pivots, links and actuators in the vicinity of the legs. This makes the leg holder more difficult to clean and service, and more expensive to manufacture.

Yet another difficulty with prior art leg holders has been the accidental breakage of the hind legs during the hide pulling operation at the leg holding point.

Accordingly, one object of the present invention is to provide an improved method and device for supporting a suspended carcass during hide removal which reduces the number of times the carcass is pulled from the trolley rail by more securely engaging the leg than has heretofore been possible.

A second object of the invention is to engage the leg in a manner which prevents the leg from being broken during the hide pulling operation.

A further object of the invention is to prevent the hide pulling force from being transmitted to the suspension means by lifting the carcass relative to the suspension means during the hide pulling operation.

Still another object of the invention is to provide a leg holding mechanism that automatically engages the leg upon extension and which tightens as the hide pulling operation progresses.

Yet another object of the invention is to provide a leg holding mechanism that is easily cleaned and sterilized after the hide is removed.

SUMMARY OF THE INVENTION

In keeping with these objects and with other objects of the invention which will become apparent hereinafter, the present invention comprises a method and device for supporting an animal carcass during hide removal.

The device in its simplest form comprises a leg holder adapted to engage and hold at least one leg of an animal carcass which is suspended from a suspension means, such as a trolley hook, and a means for lifting the leg holder relative to the suspension means to lift the carcass during hide removal and reduce strain at the suspension means.

In the preferred embodiment, the leg holder comprises a restraining plate oriented in a first plane and mounted to rotate about a hinge axis to a second plane. The restraining plate includes at least one, and preferably two, leg receiving notches. The notches have a receiving end sufficiently wide to receive a leg of the carcass and a holding end sufficiently narrow to engage and hold the leg, the holding end of each notch being outwardly spaced from the hinge axis. The carcass can then be lifted by rotating the leg holder around the hinge axis from the first plane to the second plane to elevate the holding end of the notch and thereby lift the carcass.

The rotation of the restraining plate serves not only to elevate the carcass, but also changes the angle of the centerline of the notch such that the angle between the centerline of the notch and the direction of pull is less than 90°. Thus, as the hide is pulled, the legs of the carcass are wedged more firmly into the receiving notches. The receiving notches also permit the legs to be automatically engaged by merely extending the restraining plate towards the carcass.

In the most highly preferred embodiment, the restraining plate is mounted for travel along a track extending substantially parallel to the direction of motion of the carcass such that the carcass pulls the restraining plate along the track during the hide pulling operation and there is no need to synchronize the motion of the supporting device to the motion of the carcass.

The method comprises sensing when a leg of the carcass is in front of a leg holder in a starting position, extending the leg holder towards the leg of the carcass, engaging the leg of the carcass at a holding point on the leg, lifting the carcass relative to the suspension point, supporting the lifted carcass on a track oriented substantially parallel to the direction of motion of the carcass, such that the leg holder moves from the starting position to a final position during hide removal, sensing when the final position has been reached, lowering the carcass, retracting the leg holder away from the leg of the carcass, and returning the leg holder to the starting position.

BRIEF DESCRIPTION OF THE DRAWINGS

For a fuller understanding of the invention, reference should be made to the following description taken in connection with the accompanying drawings in which:

FIG. 2 shows a perspective view of the supporting device. A portion of the front track extending parallel to the trolley rail has been broken away, and hydraulic and pneumatic hoses have been omitted for clarity.

DETAILED DESCRIPTION OF THE INVENTION

Figure 1:
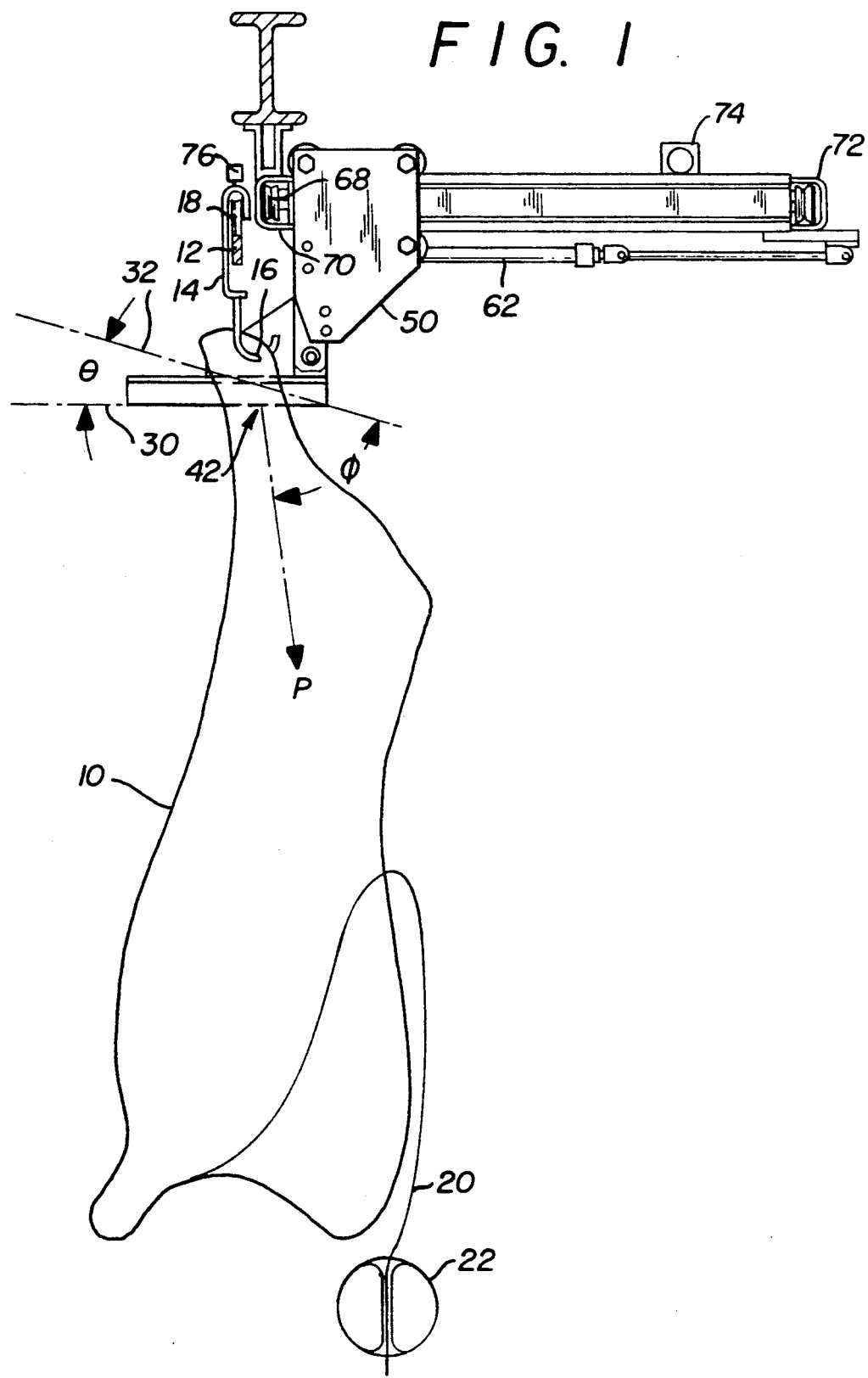
FIG. 1 is a side elevational view of the supporting device, with the leg holder in the extended position and the restraining plate and carcass not yet lifted. The rotated (elevated) position of the restraining plate is shown in phantom.

Referring to FIG. 1, a carcass 10 is suspended from an overhead trolley rail 12 by means of two trolley hooks 14 hooked through respective hind legs of the carcass 10 at a suspension point 16 on each leg. Each trolley hook 14 rides on its own wheeled trolley 18 which is continuously driven along the trolley rail by any suitable means, such as a chain drive.

The trolley hook and associated mechanism acts as a suspension means for the carcass. There are other methods of suspending a carcass which would also be suitable for use with the present invention.

The hide 20 is pulled off the carcass by a puller 22 which exerts a pulling force in the direction indicated by the arrow marked "P".

Referring to FIG. 2, the invention comprises a leg holder 24 including a restraining plate 26 oriented in a first plane and mounted to rotate about a hinge axis 28 to a second plane. In FIG. 1, the first plane is indicated with reference numeral 30 and the second plane is indicated with reference numeral 32, with the angle of rotation therebetween being marked with the symbol $\theta$. The restraining plate 26 is illustrated in both figures in the lowered first plane position which is preferably substantially horizontal.

The restraining plate includes two (2) restraining notches 34, 36 which are substantially identical to one another and are spaced to correspond to the distance between the legs of the carcass as they are moved along the trolley rail. Referring to restraining notch 36, it may be seen that each notch has a receiving end 38 sufficiently wide to receive one leg of the carcass and a holding end 40 sufficiently narrow to engage and hold the leg at a holding point 42 (see FIG. 1). The preferred holding point on the carcass is just below the hock of the hind leg, and the invention is mounted at a height relative to the carcass so that the restraining plate engages the legs at this point.

The restraining plate 26 is rotated between the first and second plane positions about the hinge axis 28 by a hydraulic actuator 44 under the control of hydraulic directional control valve 46 which is one of two substantially identical hydraulic control valves 46, 48. The control valve 46 operates in a conventional manner under electronic control to switch the hydraulic fluid supplied to hydraulic actuator 44 and move the actuator between an extended position, wherein the restraining plate 26 is in the lowered first plane position, and a retracted position, wherein the restraining plate 26 is in the raised second plane position.

Electronic control wires which lead to the directional control valves 46, 48 and hydraulic lines which lead between the control valves and the hydraulic actuator 44 and a second actuator 66 described later, have not been shown to simplify the drawings. Those skilled in the art will readily understand how these controls are arranged to achieve the desired extension and retraction of the actuators.

The holding end of the restraining notches 34, 36 is outwardly spaced from the hinge axis 28 so that as the actuator 44 rotates the restraining plate from the first plane 30 to the second plane 32, the holding end of the notches is raised relative to the suspension point. Once the carcass legs have been engaged in the restraining notches, this rotation lifts the carcass.

The angle $\theta$ between the first plane and the second plane need only be sufficient to elevate the carcass relative to the suspension means and sufficiently reduce the strain at the holding point so that carcasses are not pulled from the trolley hook suspension means. In the preferred embodiment, the angle $\theta$ is thirteen degrees (13°) and the holding point is raised one (1) to two (2) inches (2 to 5 cm), however the angle and amount of lift may be varied depending upon the application.

The leg holder assembly 24 and the actuator 44 are carried on a carriage comprising two (2) side plates 50, 52 tied together with cross rods 54. The carriage rides on eight (8) wheels 56, mounted four to a side plate in pairs above and below track members 58, 60. The track members form a first track oriented substantially perpendicular to the direction of motion of the carcass along the trolley rail 12 such that the carriage may be moved along the track to extend and retract the leg holder towards and away from the carcass.

A second hydraulic actuator 62 acts as a driver to move the leg holder 24 between the extended position (as illustrated in both figures) and a retracted position away from the carcass. The second hydraulic actuator 62 is under the control of directional control valve 48 which operates in the same manner as directional control valve 46.

The track members 58, 60 forming the first track are linked together with cross members 64, 66 to form a second carriage. This second carriage includes wheels 68 which move along a second track oriented parallel to the direction of motion of the carcass and perpendicular to the first track. The second track is formed by track members 70, 72, within which the wheels 68 ride, to move the first track and the leg holder parallel to the carcass as it moves along the trolley rail.

The second carriage can be moved by a pneumatic actuator 74 which, as will be described below, only needs to move the second carriage in one direction to return the carriage to the starting position.

The operation of the invention will best be understood by following the carcass through the hide pulling operation. As the carcass 10 moves along the trolley rail 12 into the hide pulling station, two (2) sensors 76, located adjacent to the trolley rail sense when the trolleys for each leg of the carcass have brought the carcass into the proper position, with each leg of the carcass directly in front of its corresponding leg receiving notch 34, 36. The sensors may be mechanically actuated limit switches, or optical or magnetic sensors, etc.

At this point, the restraining plate 26 will be in the lowered position in the first plane 30, the leg holder carriage comprising the side plates 50, 52 and cross rods 54 will be in the retracted position away from the trolley rail, and the main carriage comprising the track members 58, 60 and cross members 64, 66 will be in the starting position at the end of the second track formed by track members 70, 72 closest to the approaching carcass.

Upon receipt of a signal from the sensors 76 that the carcass has been brought into position in front of the leg receiving notches, hydraulic actuator 62 extends the leg holder 24 until the legs of the carcass are automatically engaged in the leg receiving notches 34, 36. In the preferred method of operation, the carcass continues to move along the trolley rail even as the legs are being engaged and throughout the hide pulling operation.

A pressure sensor is connected to the output hydraulic line feeding the extension direction of actuator 62. This sensor is preferably mounted adjacent to control valve 48 and produces an output signal, preferably by activating an electrical switch, when the hydraulic pressure exceeds a preset value in actuator 62 during the extension operation. As the legs are engaged and forced into the notches during extension, the hydraulic pressure monitored by the sensor rises, and upon reaching the preset limit, a signal is generated indicating that the legs have now been engaged. This signal stops the extension operation and initiates the lifting operation by activating control valve 46 to retract actuator 44 and rotate the restraining plate 26 from the first plane to the second plane thereby lifting the carcass.

As the extension and lifting operations are occurring, the hide 20 is engaged by the hide puller 22 which begins to remove the hide once the carcass has been elevated. As can be seen in FIG. 1, the hide pulling force is exerted in the direction indicated by arrow "P" which forms an angle $\phi$ with the centerline of the leg receiving notches 34, 36, when elevated into the second plane 32.

This angle is preferably less than 90° such that the pulling action wedges the carcass legs more securely into the notches as the pulling force is applied.

It will also be noted that the direction of the pulling force may vary slightly from carcass to carcass and during the pulling operation. In prior art designs where the legs were gripped by jaws which substantially completely encircle the legs, variations in the direction of the pulling force would occasionally cause the leg bones to be broken. However, in the present invention, the leg receiving notches hold the carcass principally by the opposite edges of the notches, and do not completely encircle the leg. This permits the carcass to rotate slightly responsive to changes in the direction of the pulling force without significant risk of breaking the legs of the carcass.

During the hide pulling operation, the carcass continues to move along the overhead trolley rail. The leg holder carriage formed by the track members 58, 60 and cross members 64, 66 is permitted to roll freely along the track members 70, 72 and parallel to the trolley rail 12. Thus, the carcass pulls the entire support assembly with it as the hide is being removed, by virtue of its being engaged through the leg holder to the support assembly and by the absence of any restriction of motion of the assembly along the second track.

A further sensor, preferably comprising a limit switch at the end of travel of the second track, senses when the carcass has arrived at a final position along the second track. The sensing of arrival at the final position may alternatively be noted by sensing the position of the trolleys on the overhead trolley rail with sensors like sensors 76, or by a signal from the hide puller that the hide has been removed.

In any event, upon arriving at the final position, the restraining plate 26 is lowered back to the first plane, actuator 62 retracts the leg holder to the disengaged position, and actuator 74 drives the assembly back to the starting position ready for the next carcass.

In the most highly preferred embodiment, a hot water or a steam sterilizing/cleaning spray is directed towards the restraining plate between each operation. Due to the simplicity of the restraining plate and restraining notch design, the plate is easily cleaned by such a spray.

Simpler embodiments of the invention than that described above may also be operated without the first and second tracks which permit the leg holder to be extended and retracted and moved parallel to a moving carcass. For example the carcass may be moved into engagement with the leg holders, instead of moving the leg holders into engagement with the carcass. Although this would necessitate a more complex system for moving the carcass, the lifting and supporting functions of the invention could still be performed, either by the rotating restraining plate shown here or by lifting the entire leg holder mechanism in a linear motion.

Alternatively, the extension/retraction function along the first track could be retained, but the second track eliminated by stopping the forward motion of the carcass during hide pulling.

While the invention has been illustrated and described in what are considered to be the most practical and preferred embodiments, it will be recognized that many variations are possible and come within the scope thereof, the appended claims therefore being entitled to a full range of equivalents.

I claim:

1. Device for supporting a suspended animal carcass during hide removal, comprising:

a leg holder adapted to engage and hold at least one leg of an animal carcass suspended from a suspension means which contacts the leg at a suspension point, the leg holder contacting and engaging the leg at a holding point on the leg; and means for lifting the leg holder at the holding point relative to the suspension means, said lifting means being operatively connected to the leg holder to lift the carcass after the leg has been engaged and reduce strain at the suspension point during hide removal.

2. Device for supporting a suspended animal carcass during hide removal according to claim 1 wherein:

the leg holder comprises a restraining plate oriented in a first plane and mounted to rotate about a hinge axis to a second plane, the restraining plate including at least one leg receiving notch, the notch having a receiving end sufficiently wide to receive a leg of the carcass and a holding end sufficiently narrow to engage and hold the leg at the holding point, the holding end of the notch being outwardly spaced from the hinge axis; and the lifting means is operatively connected to the leg holder to rotate the leg holder around the hinge axis from the first plane to the second plane to elevate the holding end of the notch and lift the carcass.

3. Device for supporting a suspended animal carcass during hide removal according to claim 2 wherein the second plane is oriented such that the angle of pull between the centerline of the leg receiving notch when in the second plane and the direction of pull during hide removal is less than ninety degrees.

4. Device for supporting a suspended animal carcass during hide removal according to claim 1 wherein:
the leg holder is hingedly mounted to rotate about a hinge axis from a first plane to a second plane;
the holding point of the leg holder is outwardly spaced from the hinge axis; and
the lifting means rotates the leg holder about the hinge axis to elevate the holding point and lift the carcass relative to the suspension means.

5. Device for supporting a suspended animal carcass during hide removal according to claim 4 further including means for extending the leg holder out of a disengaged position into a position where the leg may be engaged and retracting the leg holder back to the disengaged position.

6. Device for supporting a suspended animal carcass during hide removal according to claim 5 wherein the means for extending and retracting the leg holder cooperatively acts with the leg holder to automatically engage the leg when the leg holder is extended.

7. Device for supporting a suspended animal carcass during hide removal according to claim 6 wherein the means for extending and retracting the leg holder comprises a first track and a driver means, the leg holder being mounted for motion along the first track during extension and retraction by the driver means.

8. Device for supporting a suspended animal carcass during hide removal according to claim 7 wherein the means for extending and retracting the leg holder further comprises a sensor for determining when the leg holder has been extended sufficiently to engage the leg of the carcass.

9. Device for supporting a suspended animal carcass during hide removal according to claim 8 wherein the driver means comprises a hydraulic actuator and the sensor comprises a hydraulic pressure switch.

10. Device for supporting a suspended animal carcass during hide removal according to claim 6 wherein:
the leg holder comprises a restraining plate oriented in the first plane and mounted to rotate about the hinge axis to the second plane, the restraining plate including a leg receiving notch, the notch having a receiving end sufficiently wide to receive a leg of the carcass and a holding end sufficiently narrow to engage and hold the leg at the holding point; and
the means for extending and retracting the leg holder extends the restraining plate with the receiving end of the leg receiving notch oriented towards the leg to automatically engage the leg in the holding end of the notch.

11. Device for supporting a suspended animal carcass during hide removal according to claim 7 further including a second track oriented perpendicular to the first track, the leg holder and first track being mounted for motion along the second track to engage a carcass moving parallel to the second track.

12. Device for supporting a suspended animal carcass during hide removal according to claim 11 wherein the leg holder and first track are freely pulled by the moving carcass along the second track, after the leg holder engages the leg, from a starting point on the second track to a final point.

13. Device for supporting a suspended animal carcass during hide removal according to claim 12 further including a means for signaling the extending and retracting means to extend the leg holder when a leg of a carcass is in position in front of the leg receiving notch.

14. Device for supporting a suspended animal carcass during hide removal according to claim 13 further comprising a sensor for sensing when the leg holder has been extended sufficiently to engage the leg of the carcass, the sensor being connected to the lifting means to signal the lifting means to lift the carcass after the leg of the carcass has been engaged.

15. Device for supporting a suspended animal carcass during hide removal according to claim 14 further including a means for signaling the lifting means to lower the carcass after the leg holder and first track arrive at the final point.

16. Device for supporting a suspended animal carcass during hide removal according to claim 15 further including a means for signaling the extending and retracting means to retract the leg holder after the carcass has been lowered.

17. Device for supporting a suspended animal carcass during hide removal according to claim 16 further including a means for returning the leg holder to the starting point after the extending and retracting means has retracted the leg holder.

18. Device for supporting during hide removal an animal carcass suspended from moving suspension points on two legs, comprising:
a restraining plate oriented in a first plane and mounted to rotate about a hinge axis to a second plane, the restraining plate including a pair of leg receiving notches, one for each suspended leg of the carcass, each notch having a receiving end sufficiently wide to receive a leg of the carcass and a holding end sufficiently narrow to engage and hold the leg at a holding point, the holding end of the notches being outwardly spaced from the hinge axis, and the centerline of the notches being oriented substantially perpendicular to the direction of motion of the carcass;
at least two leg position sensors for sensing when each leg of the carcass is in front of its respective notch with the restraining plate in a starting position;
extension and retraction means for extending the restraining plate towards the carcass to engage the legs in the notches responsive to a signal from the leg position sensors that the legs of the carcass are in position in front of their respective notches and subsequently retracting the restraining plate;
means for rotating the restraining plate around the hinge axis from the first plane to the second plane to elevate the holding end of the notches and lift the carcass relative to the suspension points;
a track oriented substantially parallel to the direction of motion of the carcass, the track having the restraining plate carried thereon, the carcass pulling the restraining plate along the track to a final position during the hide pulling operation; and
means for returning the restraining plate to the starting position after the hide has been removed.

19. Method for supporting during hide removal an animal carcass suspended from a moving suspension point comprising:
a. sensing when a leg of the carcass is in front of a leg holder in a starting position;

b. extending the leg holder towards the leg of the carcass;

c. engaging the leg of the carcass at a holding point on the leg;

d. lifting the carcass relative to the suspension point;

e. supporting the lifted carcass on a track oriented substantially parallel to the direction of motion of the carcass such that the leg holder moves from the starting position to a final position during hide removal;

f. sensing when the final position has been reached;

g. lowering the carcass;

h. retracting the leg holder away from the leg of the carcass; and i. returning the leg holder to the starting position.

20. Method for supporting an animal carcass according to claim 19 wherein:

the step of sensing when a leg of the carcass is in front of a leg holder further comprises sensing when two legs of the carcass are in front of a leg holder having two leg receiving notches, one for each leg;

the step of engaging the leg of the carcass at a holding point on the leg comprises engaging both legs of the carcass in the corresponding leg receiving notches; and the step of lifting the carcass relative to the suspension point comprises rotating the leg receiving notches to lift the carcass.

21. Method for supporting an animal carcass according to claim 20 wherein the leg holder is extended towards the legs of the carcass until a sensor indicates that the legs of the carcass have been completely engaged and wherein the step of lifting the carcass occurs responsive to a signal from the sensor that the legs of the carcass have been fully engaged.

22. Method for supporting an animal carcass according to claim 21 further including the step of sanitizing the leg holder after it has been retracted away from the carcass.

* * * * *